United States Patent
Varshovi

(10) Patent No.: US 10,710,939 B2
(45) Date of Patent: Jul. 14, 2020

(54) COATED INORGANIC MATERIALS AND METHODS FOR FORMING THE COATED INORGANIC MATERIALS

(71) Applicant: GREENTECHNOLOGIES, LLC, Gainesville, FL (US)

(72) Inventor: Allan Amir Varshovi, Gainesville, FL (US)

(73) Assignee: GreenTechnologies, LLC, Gainesville, FL (US)

( * ) Notice: Subject to any disclaimer, the term of this patent is extended or adjusted under 35 U.S.C. 154(b) by 0 days.

(21) Appl. No.: 15/981,124

(22) Filed: May 16, 2018

(65) Prior Publication Data
US 2019/0152870 A1    May 23, 2019

Related U.S. Application Data

(63) Continuation of application No. 15/816,684, filed on Nov. 17, 2017, now Pat. No. 10,384,984.
(60) Provisional application No. 62/671,150, filed on May 14, 2018.

(51) Int. Cl.
| | | |
|---|---|---|
| C05G 5/30 | (2020.01) | |
| C05F 11/00 | (2006.01) | |
| C05F 9/04 | (2006.01) | |
| C05F 3/00 | (2006.01) | |
| C05F 11/02 | (2006.01) | |
| C05C 7/02 | (2006.01) | |
| C05C 3/00 | (2006.01) | |
| C05C 5/04 | (2006.01) | |

(Continued)

(52) U.S. Cl.
CPC ............. *C05G 5/30* (2020.02); *C05C 3/005* (2013.01); *C05C 5/04* (2013.01); *C05C 7/02* (2013.01); *C05D 1/005* (2013.01); *C05D 5/00* (2013.01); *C05F 3/00* (2013.01); *C05F 9/04* (2013.01); *C05F 11/00* (2013.01); *C05F 11/02* (2013.01)

(58) Field of Classification Search
CPC .. C05C 3/005; C05C 5/04; C05C 7/02; C05D 5/00; C05D 1/005; C05G 3/0041; C05F 11/02; C05F 3/00; C05F 9/04; C05F 11/00
See application file for complete search history.

(56) References Cited

U.S. PATENT DOCUMENTS

| | | | | |
|---|---|---|---|---|
| 3,708,276 A | * | 1/1973 | Hecht | ...... B01J 2/006 71/27 |
| 4,026,696 A | * | 5/1977 | Young | ...... C05C 1/00 423/396 |

(Continued)

FOREIGN PATENT DOCUMENTS

| | | | |
|---|---|---|---|
| CN | 107245001 A | * | 10/2017 |
| JP | 55009683 A | * | 1/1980 |

OTHER PUBLICATIONS

CN-106316638-A—Yang Yong.

*Primary Examiner* — Jennifer A Smith
(74) *Attorney, Agent, or Firm* — Law Office of John K. Pike, PLLC

(57) ABSTRACT

A composition and method for producing an inorganic material with an inorganic coating. The inorganic coating may include ammonium sulfate. The present disclosure also provides a fertilizer having an inorganic coating. A method according to the present disclosure includes granulating an inorganic material and coating the organic material in situ with a reactive coating composition.

14 Claims, 2 Drawing Sheets

(51) Int. Cl.
*C05D 1/00* (2006.01)
*C05D 5/00* (2006.01)

(56) References Cited

U.S. PATENT DOCUMENTS

| | | | |
|---|---|---|---|
| 5,720,794 A * | 2/1998 | Tortorelli | C05C 1/02 |
| | | | 149/46 |
| 5,749,936 A | 5/1998 | Humphries et al. | |
| 7,637,229 B2 | 12/2009 | Hurwitz et al. | |
| 2008/0016765 A1 | 1/2008 | Hartmann et al. | |
| 2008/0098781 A1 * | 5/2008 | Lylykangas | C05C 1/00 |
| | | | 71/11 |

* cited by examiner

```
                    ┌─────────┐
    100             │  START  │
                    └────┬────┘
                         ▼
    101    ┌──────────────────────────────────────────┐
           │ Place first inorganic material into setting for │
           │           forming coating                │
           └──────────────────┬───────────────────────┘
                              ▼
    102    ┌──────────────────────────────────────────┐
           │      Add additional soluble components   │
           └──────────────────┬───────────────────────┘
                              ▼
    103    ┌──────────────────────────────────────────┐
           │ React inorganic salt with reactive layer of │
           │ inorganic material to form a second inorganic │
           │                  material                │
           └──────────────────┬───────────────────────┘
                              ▼
    104    ┌──────────────────────────────────────────┐
           │  Dry first and/or second inorganic materials │
           └──────────────────┬───────────────────────┘
                              ▼
    105    ┌──────────────────────────────────────────┐
           │     Introduce other value-add components │
           └──────────────────┬───────────────────────┘
                              ▼
    106    ┌ ─ ─ ─ ─ ─ ─ ─ ─ ─ ─ ─ ─ ─ ─ ─ ─ ─ ─ ─ ─ ┐
           │ Water dissolves coating of second inorganic │
           │ material to release the first inorganic material │
           │       into the ambient environment       │
           └ ─ ─ ─ ─ ─ ─ ─ ─ ─┬─ ─ ─ ─ ─ ─ ─ ─ ─ ─ ─ ┘
                              ▼
                        ┌─────────┐
                        │ FINISH  │              FIG. 1
                        └─────────┘
```

COATED INORGANIC MATERIALS AND METHODS FOR FORMING THE COATED INORGANIC MATERIALS

CROSS-REFERENCE TO RELATED APPLICATIONS

This application claims priority to Non-Provisional U.S. application Ser. No. 15/816,684, filed on Nov. 11, 2017, entitled COATED ORGANIC MATERIALS AND METHODS FOR FORMING THE COATED ORGANIC MATERIALS, and also claims priority to Provisional U.S. Application No. 62/671,150, filed on May 14, 2018, entitled COATED INORGANIC MATERIALS AND METHODS FOR FORMING THE COATED INORGANIC MATERIALS, the contents of which are relied upon and hereby incorporated by reference.

FIELD OF THE DISCLOSURE

The present disclosure relates to a composition and method of making fertilizer. More specifically, the present invention includes a composition and method for producing an fertilizer with a first inorganic material with a first level of solubility and a coating of a second inorganic material with a second level of solubility that is generally less than the first level of solubility. The present disclosure is further related to a fertilizer composition including an inorganic coating and method of making same.

BACKGROUND OF THE DISCLOSURE

Use of soluble fertilizers on urban landscape plants, bushes, trees, and especially in agricultural settings in the production of crops, has created a variety of problems. As the world and national populations have increased, farmers and horticulturalists have come to rely increasingly on chemically synthesized fertilizers to maintain an appropriate level of plant growth and crop production for food. However, plants exposed to a high level of fertilizers in a short period of time will suffer burns.

Inorganic fertilizers are typically quick release, which may be desirable for short-term crops. However the quick release of nutrients may result in leaching and in nitrogen and phosphorus fertilizer components introduced into the environment.

Inorganic fertilizers fall broadly into three categories: nitrogen fertilizers, such as ammonium nitrate, potassium nitrate, calcium nitrate, and urea; potassium fertilizers, such as potassium sulfate and potassium nitrate; and phosphorus fertilizers, such as diammonium and monoammonium phosphate.

Cultivated plants require significant amounts of nitrogen fertilization during the growing season to maintain a desirable production, size, and color. Various inorganic nitrogen fertilizer materials are available that can supply adequate amount of nitrogen for cultivation. However, these inorganic salts and urea are highly soluble in the soil and are readily converted to nitrates that leach before there is sufficient absorption by the plants. Consequently, these soluble forms of nitrogen fertilizers are required to be applied frequently.

Thus, there is a need for a composition and method for producing inorganic fertilizer with a controllable rate of dissolution.

SUMMARY OF THE DISCLOSURE

Accordingly, the present invention provides a composition and method for producing granules of soluble inorganic material with a coating of less soluble inorganic material. The coating of less soluble inorganic materials delays the dissolution of soluble inorganic material contained within the coating. In some embodiments, the subject invention provides a homogenous inorganic-based fertilizer coated with an inorganic coating. The homogenous inorganic-based fertilizer is used for plant nutrition and soil fertility. Methods according to the invention involve the application of one or more inorganic compound(s), one or more penetrate(s), and one or more optional supplement(s) into one or more inorganic base material(s), and coating the resultant material with an inorganic material. The methods may result in new products with one or more of: increased nutrients, increased bulk density, and delayed release of the nutrients into an ambient environment.

The subject invention may further provide fertilizer products having increased nutrient content and uptake efficiency. The fertilizer products may also have reduced caking associated with organic materials. The composition and method of the subject invention may also improve chemical, physical and agronomic value of the resultant fertilizer products.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 1 illustrates a method of producing a fertilizer.

DETAILED DESCRIPTION

Figure 2:
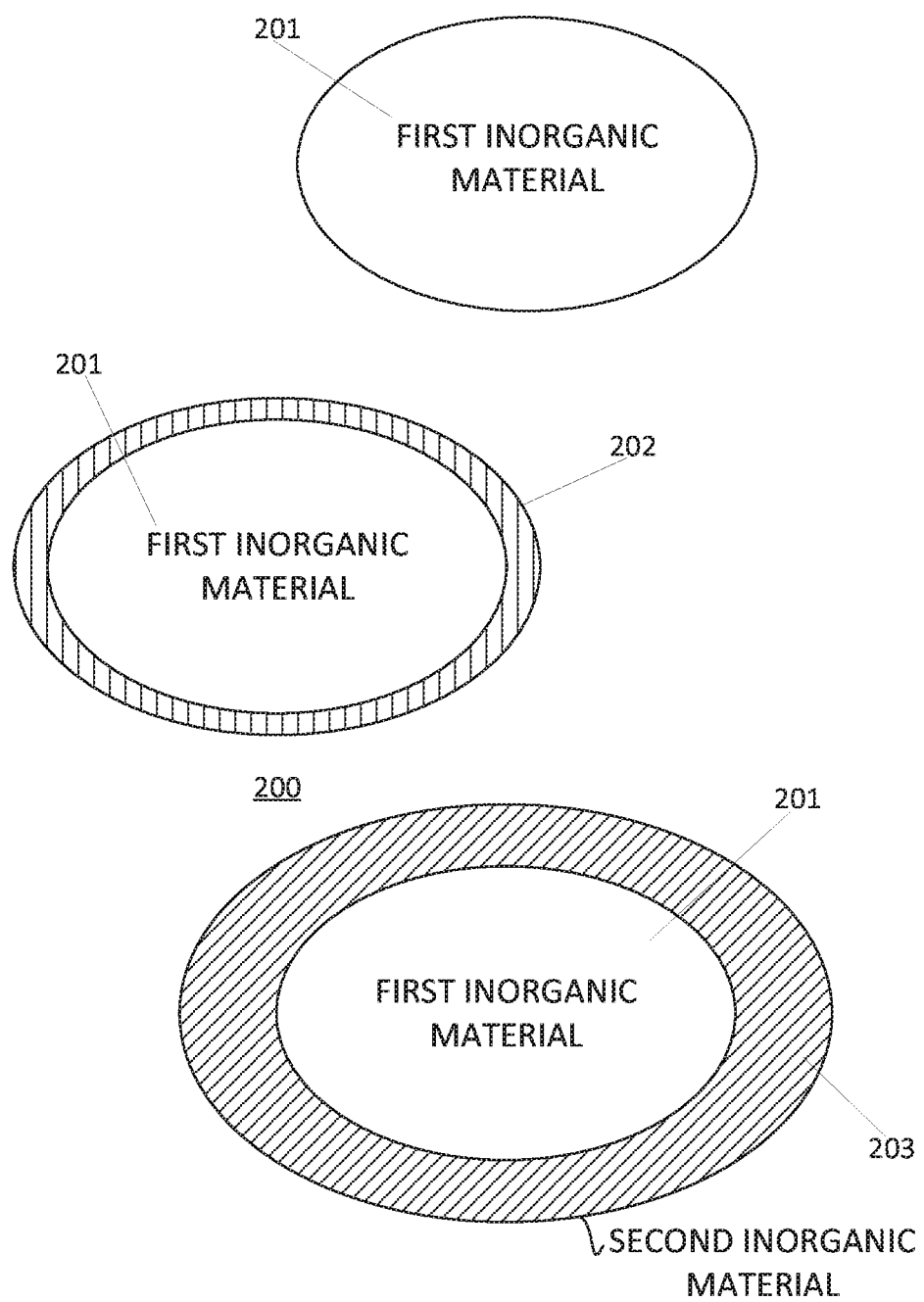
FIG. 2 illustrates a fertilizer product.

The present disclosure relates to a composition and method for coating first inorganic material with at least a second inorganic and/or organic material. Typically, inorganic materials are used to coat a soluble material; the present invention provides for coating insoluble inorganic material with an inorganic, soluble coating. More specifically, embodiments of the present invention include method to form an inorganic agronomic fertilizer with an inorganic coating and a resulting composition. The inorganic coating may include, for example, ammonium sulfate. The coating may increase the overall density and nitrogen content of the fertilizer. The present disclosure is further related to a fertilizer product including the inorganic coating.

In the following sections, detailed descriptions of examples and methods of the disclosure will be given. The description of both preferred and alternative examples though are exemplary only, and it is understood that to those skilled in the art that variations, modifications, and alterations may be apparent. It is therefore to be understood that the examples do not limit the broadness of the aspects of the underlying disclosure as defined by the claims.

The present disclosure provides a composition and method for simultaneous coating and granulation of one or both of chemical fertilizers and inorganic materials using a fine slurry comprising of one or more of: ammonium sulfate, potassium sulfate, potassium magnesium sulfate, potassium chloride, magnesium sulfate, calcium nitrate and calcium ammonium nitrate. In some embodiments, a coating may include a reactive mineral layer. A reactive mineral layer coating may be formed, for example, in situ based upon a combination of multiple components with an inorganic material. The combination allows for a first inorganic material to form and coat a second inorganic material.

In some embodiments, a coating composition may include at least one calcium salt and at least one sulfate salt. For example, calcium ion ($Ca^{2+}$ cation) in the calcium salt may react with sulfate ion ($SO_4^{2-}$ anion) in the sulfate salt to generate calcium sulfate. In a further embodiment, ammonium sulfate and calcium nitrate may react with each other to generate calcium sulfate dihydrate and ammonium nitrate. Embodiments may also include combination of a calcium and a phosphate. In some embodiments, the coating may comprise hot ash. Binders, minerals, nutrients and other components may also be added to a mixture to further a particular goal of a final product. A binder may include an organic component.

In some embodiments, the coating materials of the coating composition may be provided at different concentrations to generate the reactive layer coating with varying thickness. A reaction time for formation of the coating and granulation may vary based on the desired coating thickness and materials used. In some embodiments, the reaction time for formation of the coating and granulation may range from about five minutes to about twenty minutes.

Exemplary coating composition components are provided in Table 1 below.

TABLE 1

| Salt |
|---|
| Ammonium Sulfate |
| Potassium Sulfate |
| Potassium Magnesium Sulfate |
| Phosphate Salts |
| Magnesium Sulfate |
| Calcium Nitrate |
| Calcium Ammonium Nitrate |
| Calcium Chloride |
| Calcium Carbonate |

Embodiments of the present invention are suitable for coating a first inorganic material with a second inorganic coating in various thicknesses, depending upon, amongst other considerations, an intended use of the material; the inorganic material being coated, and the inorganic coating. Accordingly, in some embodiments, by way of non-limiting example, an effective inorganic coating composition coating an inorganic material may be between about 3% to 15% of the total weight of the finished product; and in additional embodiments, may include between about 15% and 50% of the total weight of the finished product, depending on the desired deployment of the composite material and formulation utilized. In some embodiments, an aggregate of granules of a first inorganic material with coatings of a second inorganic material of various thickness. The various respective thicknesses allow for release of the first organic material into an ambient environment via dissolution over a span of time including multiple time periods.

In various embodiments, by way of non-limiting example, an inorganic coating composition may contain between about 6% to 15% nitrogen by weight, 1% to 15% calcium by weight, 1% to 15% potassium by weight, and 1% to 15% sulfur by weight.

In some embodiments, one or both of calcium sulfate dihydrate and ammonium sulfate may be formed in situ. In situ formation may be accomplished, for example, via a chemical reaction between a calcium salt and a sulfate salt in the coating composition. The substrate material may therefore be coated with a layer comprising ammonium sulfate. An exemplary chemical reaction that can generate an inorganic coating is illustrated by Equation 1:

$$NH_4SO_4 + Ca(NO_3)_2 + H_2O \rightarrow CaSO_4 \cdot 2H_2O + NH_4NO_3 \quad \text{[Equation 1]}$$

In some embodiments, the coating of a second inorganic material may be provided on a first inorganic material comprising a homogenous inorganic-based fertilizer used for plant nutrition and soil fertility. The inorganic-based fertilizer may be produced by applying concentrated liquid(s) and/or dry formulation(s) comprising a mixture of one or more plant nutrient(s), one or more additional inorganic compound(s), one or more penetrate(s), and one or more optional supplement(s) into one or more inorganic base material(s).

In an exemplary embodiment, the inorganic-based fertilizer may include one or more of: ammonium sulfate, ammonium nitrate, potassium nitrate, calcium nitrate, urea, potassium sulfate, rock phosphate, potassium chloride, potassium carbonate, and potassium magnesium sulfate.

In some embodiments, the coating material may be in form of a liquid coating formulation or composition that may be sprayed on palletized or granulated inorganic base materials. Alternatively, the coating material can be added via direct mixture into the inorganic base material prior to granulation.

The liquid coating composition may be sprayed using liquid dispenser nozzles. The liquid coating composition may be added uniformly to allow for uniform coating on the inorganic material. In some embodiments, the addition of the liquid coating composition may be performed incrementally. The amount added during each increment may depend on the amount of inorganic material and a desired thickness of the coating.

In some embodiments, a drying process may be executed to dry the coating composition applied on the inorganic material. The coating composition may be dried at a temperature of between about 85° C. to 105° C. The coated inorganic material may be dried in a drying apparatus. In some embodiments, a dry coating formulation or composition may be applied to wet inorganic base materials prior to the drying and granulation process. The dry coating formulation reacts with the wet inorganic base materials and are mixed through the process of granulation.

In some embodiments, the coating composition may include additional nutrient materials and/or minerals for producing specialty fertilizers. The minerals may provide desirable handling characteristics. In some embodiments, a fertilizer product coated with any of the coating compositions of the present disclosure may be blended with other fertilizers.

Referring now to FIG. 1 method steps are illustrated that may be implemented in a method 100 for producing or manufacturing a coated inorganic material, in accordance with an aspect of the present disclosure. At step 101, first inorganic material is placed into a setting for forming a coating including a second inorganic material. In some embodiments, the setting for forming the coating may include a mixer in a commercial environment. In other embodiments, the setting for forming the coating may include an area of ground to be fertilized or other desirable location. Unlike traditional coating methods, such as the method utilized by pharmaceutical companies in coating pills, some of these embodiments provide for in situ coating. Accordingly, in some embodiments, a mixer is not required to form a coating of a second inorganic material. The inorganic material comprises a reactive layer and a release layer.

At step 102, in some embodiments, additional soluble components may be placed with the inorganic material. The additional components may include, by way of non-limiting example, nitrogen, nutrients, potassium sulfate and/or other additives.

At step 103, an inorganic salt is reacted with the reactive layer of the inorganic material to produce the inorganic coating in situ. The inorganic salt may be applied to the inorganic matter by spraying the inorganic salt.

At step 104, in some embodiments, an optional drying process may be carried out on the inorganic material to terminate chemical activity.

At step 105, the inorganic material coated with a coating of inorganic material may be combined with value-add components and/or fertilizer, such as plant nutrients and nitrogen.

At step 106, water is introduced to the system, dissolving the inorganic coating. This highlights the desirable nature of the present invention in circumstances of drought: the inorganic fertilizer does not begin to interact with the soil until water is present to dissolve the inorganic coating.

The coating composition may comprise of ammonium sulfate, potassium sulfate, potassium magnesium sulfate, potassium chloride, magnesium sulfate, calcium nitrate and/or calcium ammonium nitrate. In some embodiments, the coating may be a reactive mineral layer coating. In another embodiment, the coating composition may include at least one calcium salt and at least one sulfate salt. For example, calcium ion ($Ca^{2+}$ cation) in the calcium salt may react with sulfate ion ($SO_4^{2-}$ anion) in the sulfate salts to generate calcium sulfate, which may be used as an inorganic coating in some embodiments of the present invention. In a further embodiment, ammonium sulfate and calcium nitrate may react with each other to generate calcium sulfate dihydrate and ammonium nitrate. In some embodiments, the coating materials of the coating composition may be provided at different concentrations to generate the reactive layer coating with varying thickness.

In some embodiments, the coating composition may be a solution or other liquid formulation that is sprayed on the inorganic material via one or more liquid dispenser nozzles. In still other embodiments, the coating composition may be a slurry, or other suitable mixture of solid particles and one or more liquids.

The coating composition may be prepared by various methods depending on the type of coating composition. In some embodiments, the coating composition may be prepared by dissolving one or more inorganic salts in a solvent to produce a coating solution. In another embodiment, the coating composition may be prepared by mixing solid particles of two or more inorganic salts. In yet another embodiment, the coating composition may be prepared by suspending solid particles in a liquid to produce a slurry.

In some embodiments, the coating composition may be a reactive mineral coating that generates calcium sulfate dihydrate by one or more chemical reaction(s). In other embodiments, the coating composition includes at least one calcium salt and at least one sulfate salt that chemically react with each other to generate ammonium sulfate. In an exemplary embodiment, ammonium sulfate and calcium nitrate react to generate calcium sulfate dihydrate ($CaSO_4 \cdot 2H_2O$) and ammonium nitrate. In still other embodiments, the coating composition can include ammonium sulfate, calcium nitrate, potassium sulfate, potassium magnesium sulfate, potassium chloride, magnesium sulfate and calcium ammonium nitrate.

The time duration of the coating process and/or reaction time for formation of the coating may be selected appropriately based on a desired thickness of the coating and the materials used. In some embodiments, the reaction time for formation of the coating may range from about five minutes to about twenty minutes.

FIG. 2 illustrates an inorganic material 200 such as a fertilizer product as it is being formed according to some embodiments of the present disclosure. The inorganic material 200 may be a fertilizer pellet or granule. Essentially inorganic material 200 may have any shape within the scope of the present disclosure, it is illustrated in a generally naturally occurring ovoid shape, but other shapes are within the scope of the present invention. Shapes may therefore include, for example, cylindrical pellets, a sphere, cubes, or other naturally occurring to manufactured shape.

As illustrated in FIG. 2, the inorganic material 200 includes a core 201 made of an inorganic material, a reactive layer 202, and an outer coating 203 made of an inorganic material. The outer coating 203 may completely or partially enclose the core 201. Further, the outer coating 203 may have one or more layers. In some embodiments, the inorganic material includes, for example, one or more of: calcium sulfate dihydrate, ammonium sulfate, and calcium phosphate.

The reactive layer 202 reacts with an inorganic salt to form the inorganic outer coating 203. For example, in some embodiments, the reactive layer 202 may comprise a sulfate salt, and the inorganic salt may comprise calcium nitrate. The subsequent reaction forms an inorganic outer coating 203 comprising calcium sulfate.

The final outer coating 203 may have a uniform thickness or a varying thickness. In some embodiments, the final outer coating 203 may have a thickness between 10 microns and 100 microns.

In some embodiments, an inorganic coating, such as ammonium sulfate, may comprise 10% to 25% of the total weight of the outer coating 203. Further, the inorganic coating, such as ammonium sulfate, may comprise 1% to 15% of the total weight of a resulting inorganic material 200.

The inorganic material 200 with the outer coating 203 may resist auto-combustion and provide more favorable handling conditions. The outer coating 203 may also provide the inorganic material 200 with increased nitrogen content. In some embodiments, the inorganic material 200 may have increased nutrient content and uptake efficiency.

In some embodiments, the inorganic material 200 may contain (by weight) up to 15% nitrogen; up to 10% phosphorus; up to 10% potassium; up to 10% calcium; up to 5% magnesium; up to 5% iron; up to 0.05% zinc; up to 0.5% manganese; up to 0.05% copper; and up to 0.01% boron.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. A method of preparing a fertilizer composition comprising:
    contacting a first inorganic fertilizer material, the first inorganic fertilizer material comprising a plurality of granules of one or more inorganic fertilizer selected from the group consisting of ammonium nitrate, potassium nitrate, calcium nitrate, calcium ammonium nitrate, calcium chloride, calcium carbonate, urea, potassium sulfate, diammonium phosphate, monoammonium phosphate, ammonium sulfate, rock phosphate, potassium chloride, potassium carbonate, magnesium sulfate, and potassium magnesium sulfate, and a combination thereof;
    with ammonium sulfate, calcium nitrate, and water;
    and mixing, wherein in said contacting and mixing, the ammonium sulfate and calcium nitrate react, to produce, on said first inorganic fertilizer material, a coating comprising calcium sulfate dihydrate and ammonium nitrate;
    and drying;
    to prepare the fertilizer composition.

2. The method according to claim 1, wherein the contacting further comprises a step of spraying an aqueous solution comprising ammonium sulfate and calcium nitrate on the first inorganic fertilizer material.

3. The method according to claim 1, wherein the contacting and mixing further comprises contacting and mixing the first inorganic fertilizer material with a compound selected from a group consisting of potassium sulfate, potassium magnesium sulfate, potassium chloride, magnesium sulfate and calcium ammonium nitrate.

4. The method according to claim 1, further comprising a step of adding an organic binder component.

5. A fertilizer granule comprising:
    a core comprising one or more inorganic fertilizer selected from the group consisting of ammonium nitrate, potassium nitrate, calcium nitrate, calcium ammonium nitrate, calcium chloride, calcium carbonate, urea, potassium sulfate, diammonium phosphate, monoammonium phosphate, ammonium sulfate, rock phosphate, potassium chloride, potassium carbonate, magnesium sulfate, and potassium magnesium sulfate, and a combination thereof; and
    an outer coating comprising calcium sulfate dihydrate and ammonium nitrate;
    wherein a weight percentage of nitrogen in the fertilizer granule is about 15%.

6. The fertilizer granule according to claim 5, wherein the core comprises at least one of: potassium chloride, potassium sulfate, potassium magnesium sulfate, and/or magnesium sulfate.

7. The fertilizer granule according to claim 5, wherein the outer coating has a thickness between about 10 microns and about 100 microns.

8. The fertilizer granule according to claim 5, wherein a weight percentage of calcium sulfate dihydrate in the fertilizer granule is between about 1% and about 25%.

9. The fertilizer granule according to claim 5, wherein the outer coating further comprises ammonium sulfate.

10. A fertilizer granule comprising:
    a core comprising one or more inorganic fertilizer selected from the group consisting of ammonium nitrate, potassium nitrate, calcium nitrate, calcium ammonium nitrate, calcium chloride, calcium carbonate, urea, potassium sulfate, diammonium phosphate, monoammonium phosphate, ammonium sulfate, rock phosphate, potassium chloride, potassium carbonate, magnesium sulfate, and potassium magnesium sulfate, and a combination thereof; and
    an outer coating comprising calcium sulfate dihydrate, ammonium nitrate, and ammonium sulfate.

11. The fertilizer granule according to claim 10, wherein a weight percentage of nitrogen in the fertilizer granule is about 15%.

12. The fertilizer granule according to claim 10, wherein the core comprises at least one of: potassium chloride, potassium sulfate, potassium magnesium sulfate, and/or magnesium sulfate.

13. The fertilizer granule according to claim 10, wherein the outer coating has a thickness between about 10 microns and about 100 microns.

14. The fertilizer granule according to claim 10, wherein a weight percentage of calcium sulfate dihydrate in the fertilizer granule is between about 1% and about 25%.

\* \* \* \* \*